United States Patent [19]
Rausch et al.

[11] Patent Number: 5,527,081
[45] Date of Patent: Jun. 18, 1996

[54] CONVERTIBLE VEHICLE TOPWELL DRAINAGE ARRANGEMENT

[75] Inventors: Jeffrey S. Rausch, Royal Oak; Joseph Cottone, Sterling Heights; Randall C. Querro, Macomb Township; Paul C. Pellerito, Metamora, all of Mich.

[73] Assignee: Chrysler Corporation, Auburn Hills, Mich.

[21] Appl. No.: 409,398

[22] Filed: Mar. 24, 1995

[51] Int. Cl.⁶ .................................................. B60R 13/01
[52] U.S. Cl. ........................... 296/107; 296/208; 296/124
[58] Field of Search ..................................... 296/107, 208, 296/124; 137/351, 354

[56] References Cited

U.S. PATENT DOCUMENTS

| | | |
|---|---|---|
| 2,888,274 | 5/1959 | Premo . |
| 2,991,120 | 7/1961 | Barenyi . |
| 3,143,373 | 8/1964 | Fordyce . |
| 3,630,568 | 12/1971 | Podwys . |
| 4,071,273 | 1/1978 | Hack et al. . |
| 4,176,877 | 12/1979 | Schulz et al. . |
| 5,127,703 | 7/1992 | Takahashi ........................... 296/208 X |
| 5,417,465 | 5/1995 | Koppenstein et al. .............. 296/208 X |

*Primary Examiner*—Joseph D. Pape
*Attorney, Agent, or Firm*—Thomas G. Pasternak

[57] ABSTRACT

A split-installation drainage arrangement for a convertible vehicle topwell assembly adapted for storage of the top in a downwardly folded position. The plastic shell-like topwell includes a floor molded with right and left side water collecting areas each terminating in a drainage recess. A sub-assembly, adapted for transporting water from an associated recess to the exterior of the vehicle, includes a one-piece discharge fitting and a sealing grommet interconnected by a flexible drain tube. The tube has one end attached to an exit spout of the fitting and its other end adapted for insertion in a body panel aperture by means of a snap-in sealing grommet. The sub-assemblies are readily installed in the vehicle body prior to the installation of the topwell. Each fitting has a collar adapted for snap-in mounting in a body support panel oval-shaped aperture. As a result, the frusto-conical shaped drainage recess exterior male taper surface is located in self-aligned spaced relationship with the interior female taper surface of the subjacent frusto-conical shaped fitting obviating assembly line inter-connections between the floor recess and the support panel fitting.

12 Claims, 5 Drawing Sheets

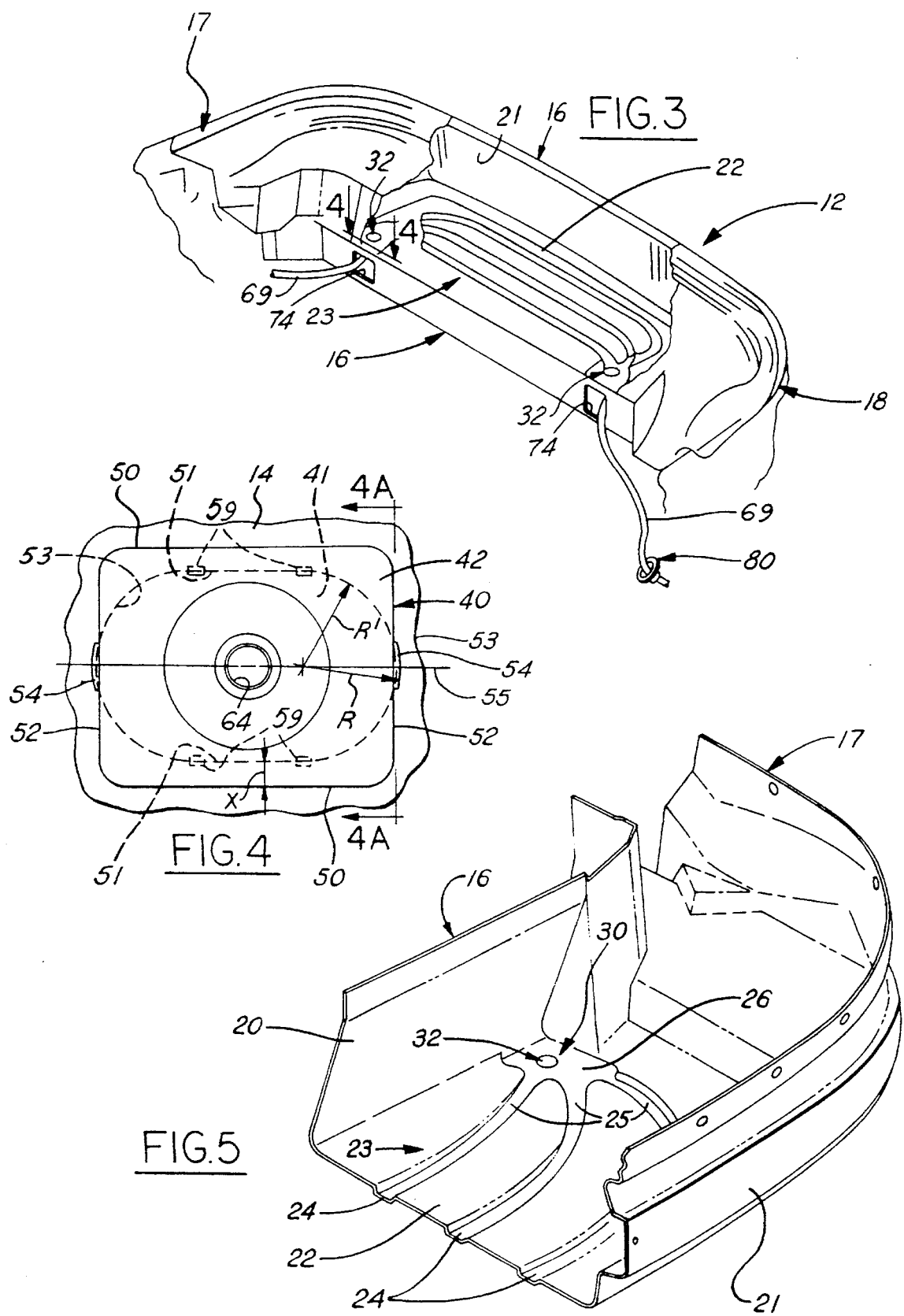

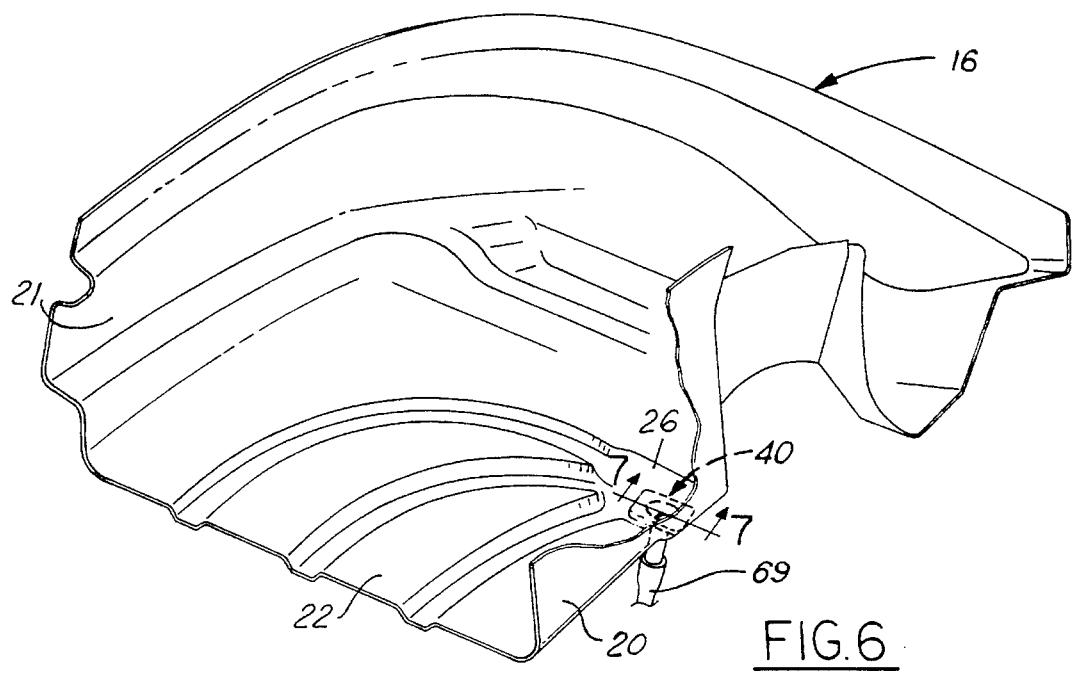
FIG. 6
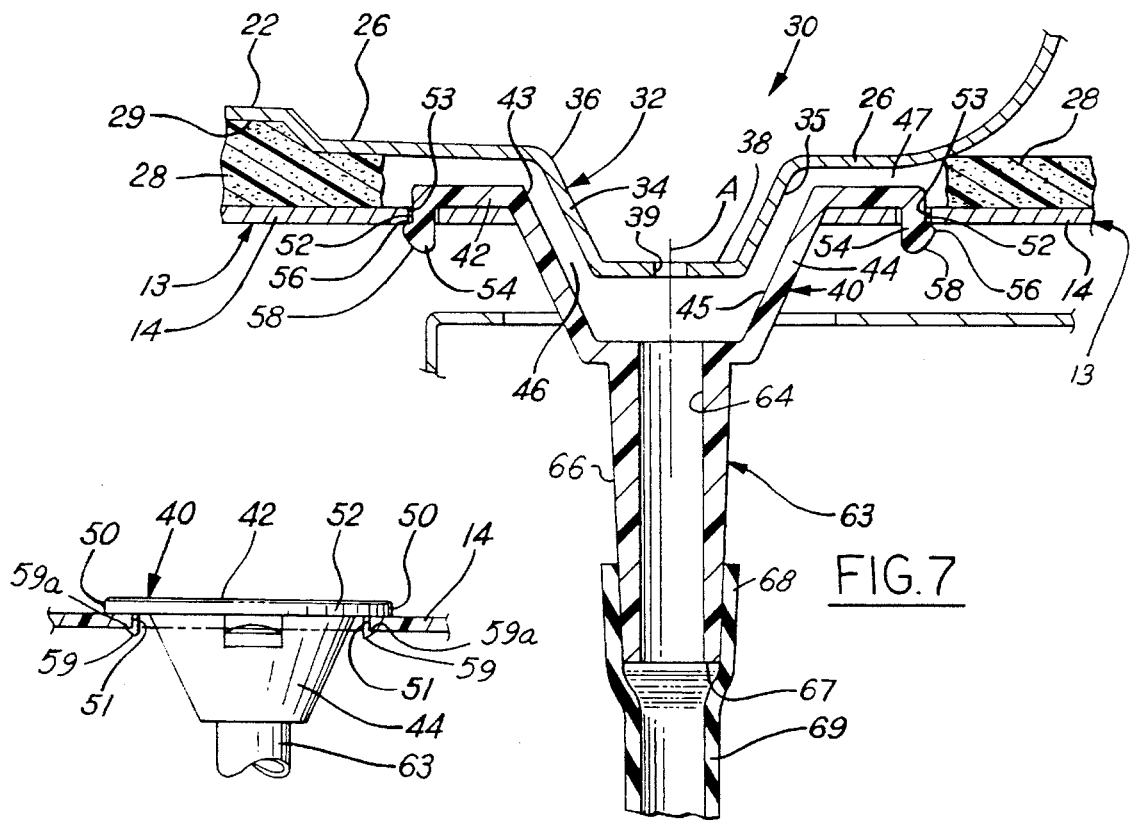
FIG. 7
FIG. 4A

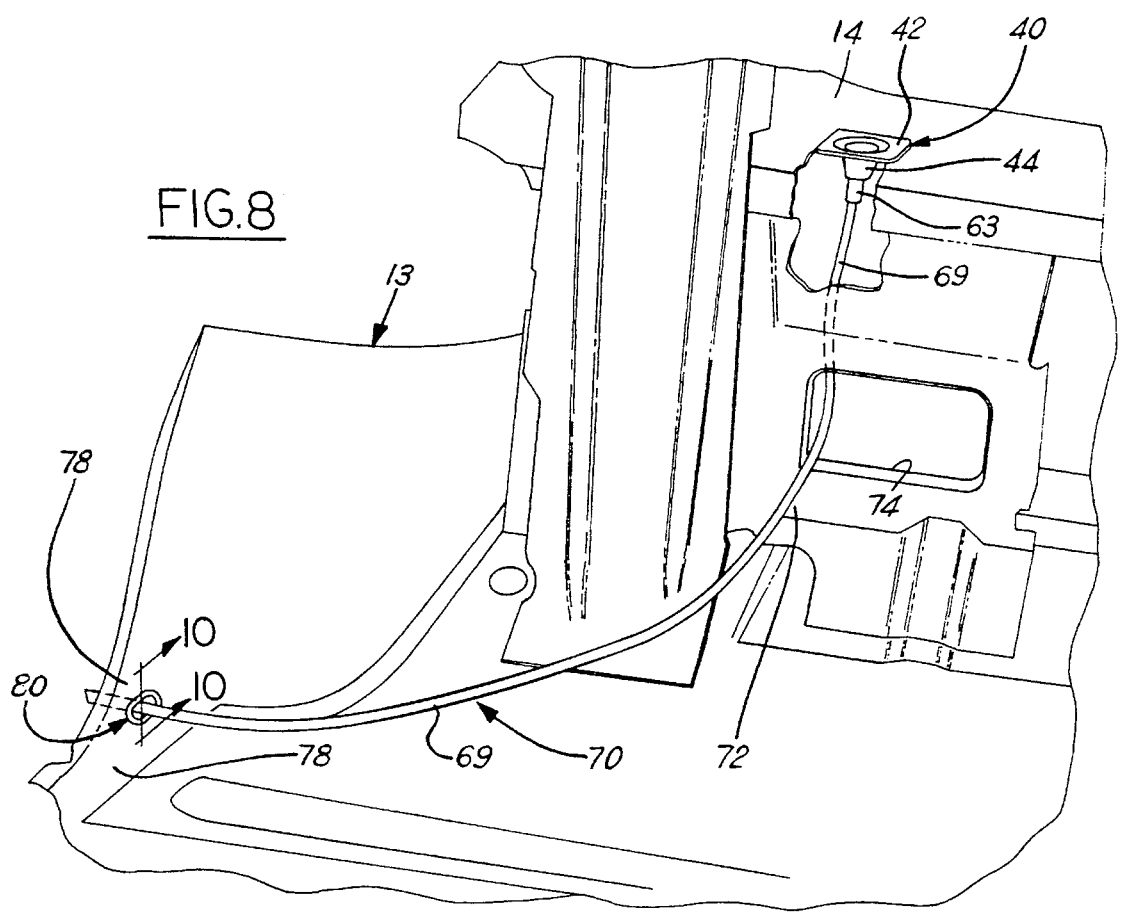
FIG. 8
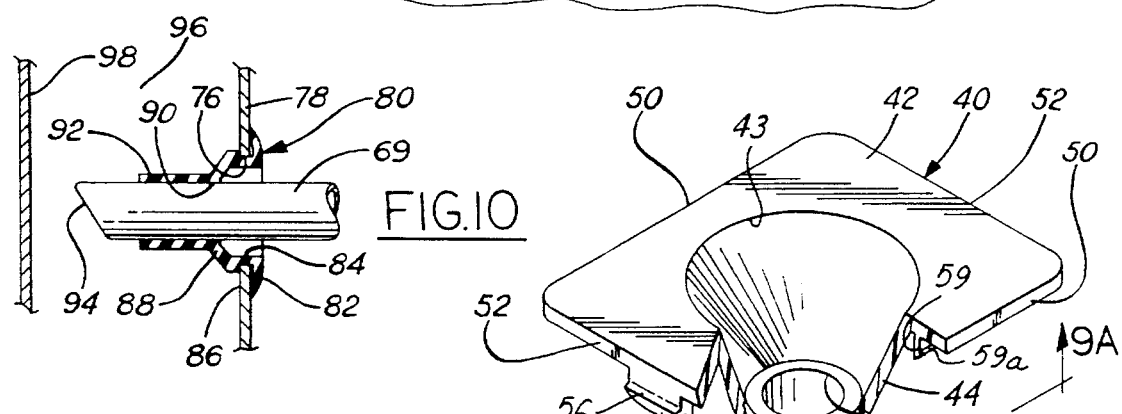
FIG. 10
FIG. 9
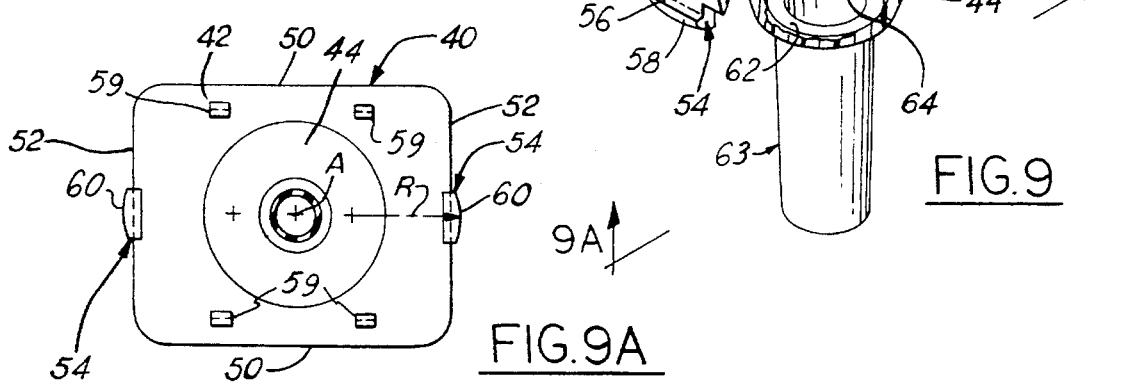
FIG. 9A

CONVERTIBLE VEHICLE TOPWELL DRAINAGE ARRANGEMENT

FIELD OF THE INVENTION

This invention relates generally to convertible type vehicles and, more particularly to an arrangement for draining water from a molded shell-like topwell, providing a storage shell adapted for storing a collapsible top of a convertible vehicle when the top is in its down position.

BACKGROUND OF THE INVENTION

In most current convertible automotive vehicles the folded collapsible top is stored in a topwell storage area provided behind the rear seat of the vehicle. In both the up and down positions of the convertible top, the topwell storage area is subject to water accumulation as it is impossible to completely seal a rear window to the surrounding fabric material of the top. Further, the stitching through the top fabric material is a potential source of water leakage.

An example of one prior art convertible vehicle drainage arrangement is shown in U.S. Pat. No. 3,143,373 issued Aug. 4, 1964 to Fordyce entitled Drain Tube Assembly. The Fordyce patent embodies a drain tube of one piece construction having a body portion with a flange at each end which is larger than the drain openings in the two members. One flange is attached to the surface of one member at its drain opening and the second flange is compressible through the second drain opening in the other member. The second flange, upon it being projected though the second drain opening, expands its free end dimension, thereby retaining the drain tube against withdrawal from the opening of the second member.

The U.S. Pat. No. 4,071,273 issued Jan. 31, 1978 to Hack et al. discloses a water discharge, especially for hollow spaces in motor vehicles structures. The Hack patent discloses a water discharge nozzle in which the water discharge opening of the nozzle is surrounded on its side facing the atmosphere by an apron whose interior width and whose height amounts to a multiple of the interior width of the water discharge opening.

The U.S. Pat. No. 4,176,877 issued Dec. 4, 1979 to Schultz et al. discloses a vehicle water discharge nozzle of the type shown in the Hack patent wherein several water outlet or discharge openings are arranged in the wall of a funnel-shaped area.

The U.S. Pat. No. 2,991,120 issued Jul. 4, 1961 to Barenyi discloses a sedan type motor vehicle with rimmed top and a downwardly extending drainage tubular line which discharges within a double-walled structure, for example within the wheel fenders of the vehicle body.

SUMMARY OF THE INVENTION

It is a feature of the present invention to provide an improved drainage arrangement for a convertible vehicle molded shell-like topwell enabling split-installation of a drainage sub-assembly and the topwell during a vehicle assembly line operation.

It is another feature of the present invention to provide an improved drainage arrangement for a convertible vehicle molded topwell as set forth above wherein the first installed sub-assembly comprises a discharge fitting, a flexible water drainage tube and a sealing grommet. The fitting has an outlet spout resiliently connected to one upstream end of the flexible tube while the sealing grommet provides a resilient retention between a body panel aperture and the downstream discharge end of the tube. An advantage of the split-installation of the present invention is that the three element sub-assembly is adapted to be exactly installed, in a ready, un-hindered manner in a convertible vehicle body production line operation prior to the location thereabove of the topwell storage shell.

Another advantage of the present invention is to provide a molded topwell and drainage sub-assembly, as set forth above, wherein the topwell is adapted to be fixedly installed in the vehicle in a predetermined location by a plurality of fasteners without the need to locate, sort and connect fittings, drainage tubes, grommets, etc. during installation of the topwell.

It is yet another feature of the invention to provide an improved drainage arrangement for convertible vehicle topwell wherein allow that a frusto-conical shaped drainage recess, integrally molded in a floor of the topwell, is adapted to be self-aligned, in a spaced manner, with a subjacent discharge fitting snap-fitted into an existing body panel aperture.

BRIEF DESCRIPTION OF THE DRAWINGS

These and other objects, features and advantages of the present invention will become apparent to those skilled in the art upon reference to the following written description and the accompanying drawings in which:

FIG. 3 is a fragmentary enlarged detail perspective view of the topwell of FIG. 2;

FIG. 4 is a fragmentary top view taken on the line 4—4 of FIG. 3;

FIG. 4A is a fragmentary vertical sectional view, partly in elevation, taken on the line 4A—4A of FIG. 4;

FIG. 5 is an fragmentary enlarged perspective detail view of the right hand topwell section of FIG. 3;

FIG. 6 is an enlarged detail perspective view of the left hand top well section of FIG. 3;

FIG. 7 is a fragmentary vertical sectional view taken on the line 7—7 of FIG. 6;

FIG. 8 is a fragmentary perspective view of the left hand flexible water drainage tube;

FIG. 9 is an enlarged detail perspective view of the water discharge grommet of FIG. 7;

FIG. 9A is a plan view of the underside to the grommet-funnel of FIG. 9;

FIG. 10 is a fragmentary vertical sectional view taken on the line 10—10 of FIG. 8;

DETAILED DESCRIPTION OF THE PREFERRED EMBODIMENT

Figure 1:
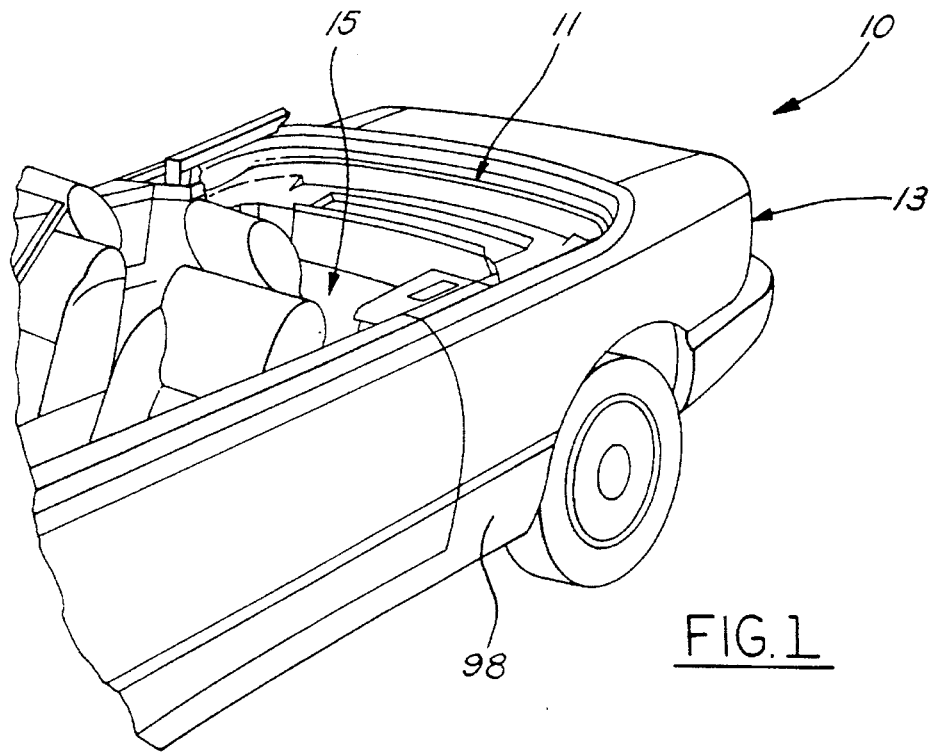
FIG. 1 is a fragmentary perspective view of a convertible vehicle body in its top down or storage position.
Figure 2:
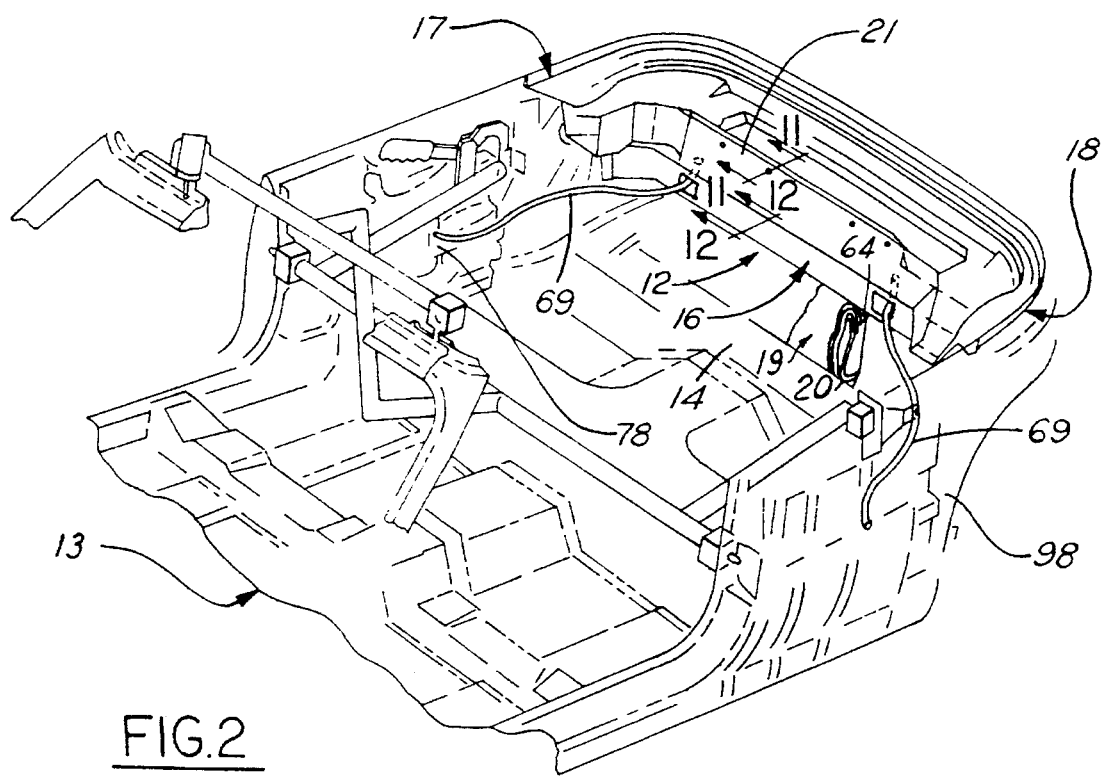
FIG. 2 is a fragmentary perspective view of the convertible vehicle body of the FIG. 1 showing portions of the topwell drainage arrangement.

Referring now to the drawings and more particularly to FIG. 1, a convertible automotive vehicle 10 includes a convertible top 11 shown placed in a top down or storage position in a topwell assembly 12. FIG. 2 shows the topwell assembly 12, assembled in convertible vehicle body 13 and supported in operational spaced relationship on a horizontal underlying body support panel 14 (FIG. 7). The vehicle 10 also includes a back or rear seat assembly 15 (FIG. 1) positioned in front of the topwell assembly 12. It will be noted that the topwell assembly 12 performs a three fold function, i.e. collecting and draining away any accumulated water from the vehicle 10, providing a storage area when the top is up and providing a silencing mechanism to reduce vehicle noise.

Figure 12:
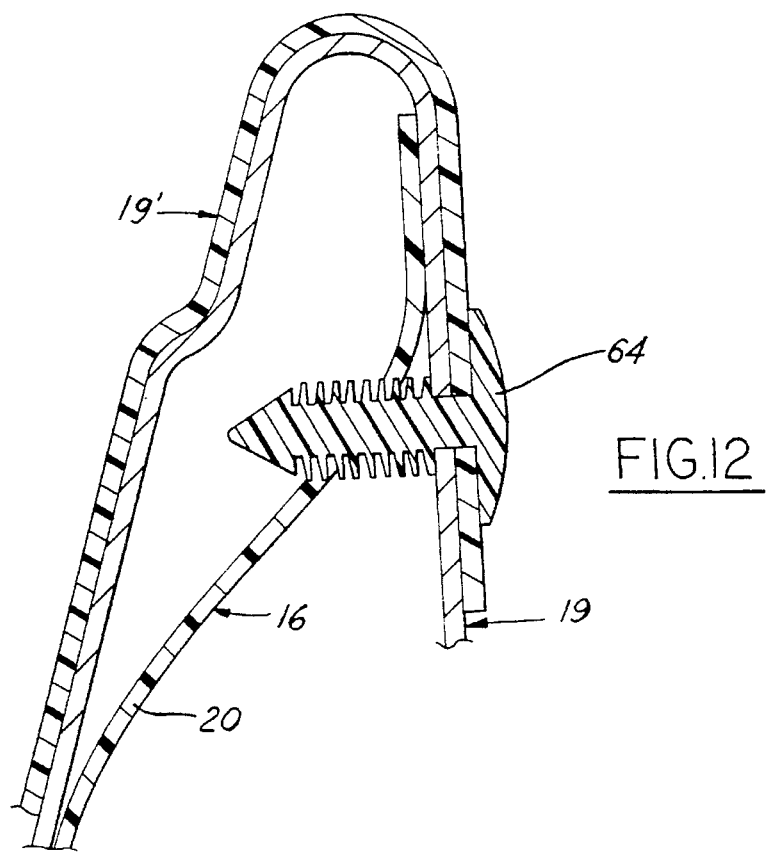
FIG. 12 is a fragmentary enlarged vertical sectional view taken on the line 12—12 of FIG. 2.

As illustrated in FIGS. 2 and 3, the topwell assembly 12, molded from a synthetic resin or plastic material such as polyurethane for example, comprises a transversely extending molded central shell portion 16 interconnecting right hand and left hand side shell portions 17 and 18, respectively. FIG. 12 shows the central shell portion 16 having a front wall 20, which is supported on a transverse inverted U-bar or "beauty-bar" 19, having a outer conforming plastic cover 19' fitted thereon.

The topwell assembly, which includes an aft wall 21, joined by topwell floor 22, provides a surface area for storing both the convertible top 11, when the top is in the down position. Further, the topwell provides a storage space for luggage or other materials when the top 11 is in an up or cover position.

The topwell floor 22 is molded with a water collecting network, generally indicated at 23. In the disclosed embodiment the floor 22 includes a plurality of transversely extending longitudinally spaced channels 24 each terminating in arcuate mirror image portions 25 at their outboard ends. The arcuate end portions 25 each drain into associated right hand and left hand collecting areas 26. The channel network 23 provides a structural support to further increase the rigidity and strength of the topwell molded floor 22.

With reference to FIG. 7, the topwell assembly 10 further includes an insulating material 28 on the backside or underside surface 29 of the floor 22 and the collecting areas 26. The purpose of the insulating material 28 is to reduce vehicle noise through noise dampening and absorption. Preferably, the insulating material 28 includes a pad of fibrous or foam material adhered or bonded to the underside surface of the floor 22.

Additionally, the channel network 23 splits the water drainage into right hand and left hand outboard and forward flows toward their respective collecting areas 26. Each collecting area has a drain arrangement, generally indicated at 30 in FIG. 7, from which the water exits each side of the vehicle 12.

It will be appreciated that the topwell assembly 12, which may be molded as a unitary member, is made in a shape which conforms to an environment of continuous and non-continuous surfaces. As a formed part, the topwell assembly 12 allows for maximum use of storage space while minimizing any gaps and voids in adjacent parts.

Referring to FIG. 7, the drain arrangement 30 comprises a water run-off drainage recess 32 integrally molded in the shell depressed collecting floor portion 26. The recess 32 has a frusto-conical shaped side wall 34 having a male taper surface 35 defining an upper circular inlet opening 36 and a lower apertured base wall 38. It will be noted that the recess base wall 38 has a circular opening 39 with has its center aligned on vertical axis of symmetry "A" of the frusto-conical shaped recess 32.

With reference to FIGS. 7 and 9 a one-piece water discharge fitting, generally indicated at 40, is shown as an integral one-piece member formed of synthetic resin or plastic material. As seen in FIG. 4 the fitting 40 is supported in an existing lightening oval-shaped opening 41 formed in the vehicle horizontally disposed metal body panel 14. The body panel 14 is shown in FIG. 4 spaced a predetermined vertical dimension beneath the topwell floor water runoff drainage recess 32.

With reference to FIG. 9 the fitting 40 comprises an upper rectangular-shaped mounting collar 42 extending radially outwardly from an upper end circular opening 43. The fitting 40 is formed with a frusto-conical shaped funnel wall portion 44 defining a female taper internal surface 45 matching in predetermined spaced relation the exterior male taper surface 35 of drainage recess 32. The male and female tapered surfaces 35 and 45 respectively, are dimensioned to provide a frusto-conical shaped annular radially spaced clearance 46 therebetween. The radially spaced clearance 46 is substantially equal to the height of the horizontally disposed clearance space 47 between the mounting collar 42 and the overlying water collecting floor portion 26.

As best seen in FIGS. 4 the water discharge fitting 40 upper rectangle-shaped mounting collar 42 is defined by longitudinally spaced apart side edges 50 and laterally spaced apart end edges 52. The side edges 50 are shown positioned parallel to and spaced a predetermined overhang dimension "X" from oval-shaped body panel aperture linear side edge borders 51. It will be noted that the overhang of said side edges 50 establishes four collar corners juncture overlying areas thereby insuring adequate load transfer distribution between the collar and the subjacent support panel. The overhang dimension "X" is of the order of 5 mm in the disclosed embodiment.

FIG. 4 shows the fitting collar 42 having its end edges 52 being formed with oppositely facing downwardly projecting tabs 54 aligned on a vertically disposed transversely extending fitting plane of symmetry which plane includes a major axis centerline 55.

It will be noted in FIG. 7 that outer opposite faces of the tabs 54 define downwardly and outwardly sloped locking shoulders 56 while their distal free ends terminate in downwardly and outwardly bowed arcuate cam portions 58. It will be further noted in FIG. 9A that the tab cam portions 58 each have an leading arcuate profile 60 in plan formed by a radius of curvature "R" having its center on the fitting principal axis "A".

As seen in FIG. 4 the cam profile radius of curvature "R" is substantially equal but slightly greater than to the radius of curvature "R'" of the panel oval aperture half-round end edge borders 53. Thus, the tab compound-curved cam profile 60 allows the tabs 54 to readily self-center the fitting 40 above the oval-shaped aperture 41 for snap-action locking engagement of the tab shoulders 56. In FIG. 4A it will be seen that as the fitting collar side edges 50 overlie the body support panel 14 while the tab shoulders 56 engage the opposed arcuate edges of the support panel 14 thereby locking the fitting 40 in the oval aperture 41. It will also be noted that the fitting 40 is positively retained in the oval-shaped aperture 41 by virtue of its rectangular collar 42 providing four extended corner areas in overlying flush engagement with the upper surface of the body support panel 14.

As best seen in FIGS. 9 and 9A the collar undersurface includes fore and aft pairs of downwardly projecting snap-in prongs 59 spaced a predetermined dimension inwardly from each collar side edge 50. With reference to FIG. 4A it will be seen that each prong 59 has a retaining shoulder 59a adapted to engage an underside of the support panel 14 to insure positive retention of the fitting 40 in the aperture 41.

With reference to FIG. 7 the fitting frusto-conical shaped side wall 44 terminates in a lower small diameter bottom wall 62 having a vertically downwardly extending integral exit spout 63. The elongated spout 63 defines an axial passageway 64 between the recess outlet hole 39 and the fitting exit pipe concentric axial passageway. The fitting exit spout has its exterior surface 66 formed with a male taper, the lower exit end 67 of which is received in one end 68 of a length of flexible plastic tube 69. The tube upper end 68 is shown stretched over the lower downstream end of the exit pipe 63 for resilient retention thereon.

As seen in FIG. 8 the fitting 40 forms, together with the interconnecting tube 69 and a grommet washer 80, a subassembly 70 which is adapted for ready production line installation in the convertible body 13 prior to the installation of the topwell assembly 12. With reference to FIG. 8 it will be seen that with the fitting 40 snapped into the body inner panel oval-shaped aperture 41 the flexible tube 69 is feed downwardly on the forward side of body back panel 72 for rearward passage through a rectangular opening 74 therein. The tube 69 is then passed through an existing oval-shaped opening 76 in the body wheel well vertically disposed inner panel 78. With reference to FIG. 10 the tube 69 is retained in the opening 76 by a snap-in rubber sealing grommet 80.

It will be noted that the sealing grommet 80, the third element of the subassembly 70, has an oval-shaped radially extending flange 82 on inboard end of an oval-shaped connecting portion 84 sized for a snug fit in the panel opening 76. The tubular connecting portion 84 is formed with an outboard or exterior oval-shaped shoulder 86 spaced a predetermined axial dimension from the inboard flange 82. The connecting portion 84 is joined at its downstream or outboard end in an oval-shaped lead-in portion 88 having a its small oval end provided with a circular adapted to snugly surround the drainage tube 69. The sealing grommet 80 terminates in an outboard tubular portion 92 adapted to resiliently surround the inserted tube 69 preventing slippage of the tube during installation.

As seen in FIG. 10 the tube 69 has its open free discharge end 94 positioned in a body low pressure space such as the rear wheel-well area 96. The area 96 is defined intermediate the inner panel 78 and an outer body panel 98 such that drain water from the fitting spout 66 is discharged into an exterior low pressure area 96.

Figure 11:
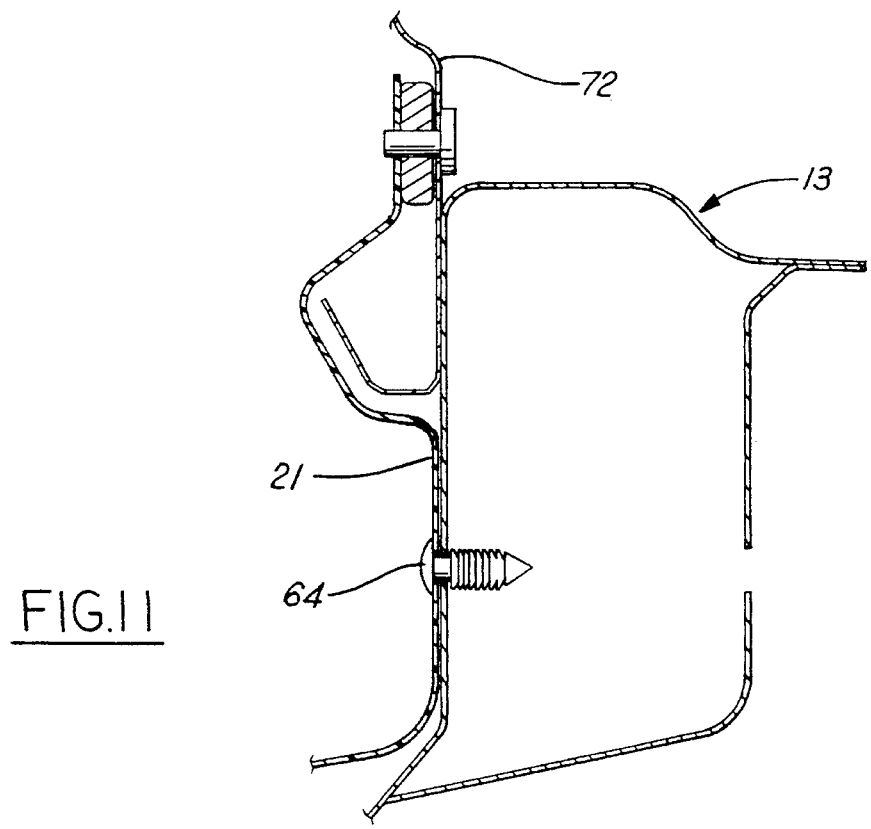
FIG. 11 is a fragmentary enlarged vertical sectional view taken on the line 11—11 of FIG. 2.

With reference to FIGS. 2 and 3 the topwell assembly 12 is shown positioned in the convertible body topwell area with its rear wall 21 being suitably secured to vehicle body upstanding backwall 72 (FIG. 11) as by headed fasteners 64. In the disclosed form the topwell fasteners 64 are of the conventional plastic-headed push-in type having a shank which includes a conical point and a series of flexible retention fins adapted to be received in a body sheet metal panel hole. Upon the topwell sub-assembly being secured to the vehicle body 13 the water collecting recess 32 is in axial alignment with the underlying fitting 40.

While the principles of the invention in connection with the specific apparatus has been described, it is to be understood that the foregoing detailed description has been made by way of example only and not as a limitation to the scope of the invention as set forth in the accompanying claims.

What is claimed is:

1. A topwell assembly drainage arrangement for an automotive vehicle body comprising:

a molded, rigid shell-like topwell assembly for attachment to the vehicle body and made of plastic material molded to conform to an environment of continuous and non-continuous surfaces, comprising a support floor together with side, front and rear walls projecting upwardly from said floor, said floor having a water discharge recess adapted to receive run-off water drainage;

said recess having a frusto-conical shaped side wall defining an upper large diameter inlet opening in the surface of said floor and terminating in a lower small diameter base wall, said base wall having a concentric central outlet hole therein aligned on a principal axis of symmetry of said recess;

a plurality of fasteners for fixedly installing said topwell assembly floor a predetermined dimension above a subjacent horizontally disposed body support panel having an aperture therein;

a water discharge one-piece fitting mounted in said support panel aperture prior to said topwell assembly being installed thereabove, whereby upon said assembly being installed the center of said support panel aperture is aligned on said recess principal axis;

said fitting having an annular body side wall defining an upper large diameter opening and terminating in a lower bottom wall, a collar extending radially outwardly from said upper opening and said bottom wall formed with a downwardly extending spout defining an axial passageway for water exiting said recess; and said collar having side edges formed with oppositely facing downwardly projecting tabs adapted for snap-in reception in said support panel aperture.

2. The topwell assembly drainage arrangement as set forth in claim 1 wherein said body support panel aperture being oval-shaped defined by a pair of opposed parallel transversely extending side edge borders and a pair of opposed half-round end edge borders.

3. The topwell assembly drainage arrangement as set forth in claim 1 wherein said fitting bottom wall aperture defining a lower tubular spout extending downwardly therefrom, a flexible tube having one end connected to said spout and its other end extending through an opening in a body inner panel, such that said tube having its other open end positioned in an exterior low pressure area defined intermediate said inner body panel and an outer body panel whereby drain water from said spout is discharged in said low pressure area.

4. The topwell assembly drainage arrangement as set forth in claim 2 wherein said fitting collar being rectangular-shaped defined by a transverse side edges and longitudinal end edges, said collar end edges being formed with oppositely facing downwardly projecting tabs aligned on a transverse center line of said collar, each said tab having an outer face formed with a downwardly and outwardly sloped locking shoulder terminating in outwardly bowed lead-in self-centering cam portion having a radius of curvature substantially equal to but slightly greater than the radius of curvature of the oval-shaped aperture half-round end edge border.

5. The topwell assembly drainage arrangement as set forth in claim 3 wherein said inner panel is an inner rear panel and said outer panel is an outer rear fender panel and wherein said low pressure area is a rear wheel-well.

6. The topwell assembly drainage arrangement as set forth in claim 1 wherein said body support panel oval-shaped aperture having an upper surface in flush contact with an opposed undersurface of said fitting collar and wherein said locking shoulder of each said depending tab underlies a portion of said body panel.

7. The topwell assembly drainage arrangement as set forth in claim 1 wherein said drainage recess having a frusto-conical shaped side wall formed with a male exterior taper surface defining an upper large diameter circular inlet opening and a lower small diameter circular base wall having a concentric circular opening, and wherein the fitting formed with a frusto-conical shaped funnel wall portion defining a female interior taper surface matching in a predetermined spaced relation said male exterior taper surface.

8. The topwell assembly drainage arrangement as set forth in claim 7 wherein the vertical spacing between topwell floor water run-off collecting areas and said subjacent fitting collar is substantially equal to the spaced clearance between the male and female tapered surfaces.

9. The topwell assembly drainage arrangement as set forth in claim 1 wherein the vehicle is a convertible top automotive vehicle.

10. A one-piece discharge fitting adapted for snap-in attachment in an oval-shaped aperture of a body support panel, wherein the aperture defined by a pair of opposed parallel side edges and a pair of opposed half-round end edges having a predetermined radius of curvature, said discharge fitting comprising:

a frusto-conical shaped side wall portion defining an upper large diameter opening and terminating in a lower small diameter bottom wall defining a funnel-shaped cup;

a rectangular-shaped collar extending outwardly from said upper opening and said bottom wall formed with a downwardly extending spout defining an axial passageway for water exiting said spout;

said collar having side and end edges, said end edges being formed with oppositely facing downwardly projecting tabs symmetrically aligned on a major center line axis of said collar;

each said tab having an outer face formed with a downwardly and outwardly sloped locking shoulder terminating in an outwardly bowed lead-in self centering cam portion having a radius of curvature substantially equal to but slightly greater than said predetermined aperture half-round end edge border radius of curvature, and whereby the support panel having an upper surface flush with an opposed undersurface of said collar and wherein each said tab locking shoulder adapted to underlie a portion of the support panel.

11. The discharge fitting as set forth in claim 10 wherein said collar side and end edges defining radiused corner junctures adapted to overlie said support plate in a flush manner, thereby insuring adequate load transfer between said collar and the subjacent support panel.

12. The discharge fitting as set forth in claim 9 wherein said collar having an undersurface formed with two pair of downwardly projecting snap-in prongs spaced a predetermined dimension inwardly from each collar side edge, each said prong having a retaining shoulder adapted to engage an underside of the support panel thereby insuring positive alignment of said fitting in the support panel aperture.

* * * * *